United States Patent
Kiyonaga et al.

(10) Patent No.: US 10,867,629 B1
(45) Date of Patent: Dec. 15, 2020

(54) DATA STORAGE DEVICE EMPLOYING STAGGERED SERVO WEDGES TO INCREASE CAPACITY

(71) Applicant: Western Digital Technologies, Inc., San Jose, CA (US)

(72) Inventors: Toshihisa Kiyonaga, San Jose, CA (US); Satoshi Yamamoto, San Jose, CA (US); Peng Huang, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/808,656

(22) Filed: Mar. 4, 2020

(51) Int. Cl.
*G11B 5/55* (2006.01)

(52) U.S. Cl.
CPC ............ *G11B 5/553* (2013.01); *G11B 5/5569* (2013.01); *G11B 5/5526* (2013.01); *G11B 5/5534* (2013.01); *G11B 5/5539* (2013.01); *G11B 5/5543* (2013.01); *G11B 5/5547* (2013.01); *G11B 5/5565* (2013.01)

(58) Field of Classification Search
None
See application file for complete search history.

(56) References Cited

U.S. PATENT DOCUMENTS

| | | | |
|---|---|---|---|
| 5,859,742 A * | 1/1999 | Takaishi | G11B 5/5534 360/77.07 |
| 6,388,829 B1 | 5/2002 | Nazarian | |
| 6,735,032 B2 | 5/2004 | Dunn et al. | |
| 6,952,322 B1 | 10/2005 | Codilian et al. | |
| 7,133,233 B1 | 11/2006 | Ray et al. | |
| 7,158,335 B2 * | 1/2007 | Park | G11B 5/5534 360/77.02 |
| 7,505,223 B1 | 3/2009 | McCornack | |
| 8,537,486 B2 | 9/2013 | Liang et al. | |
| 8,792,202 B1 | 7/2014 | Wan et al. | |
| 8,958,179 B1 * | 2/2015 | Ueha | H02K 41/0358 360/266.4 |
| 8,970,979 B1 | 3/2015 | Jia et al. | |
| 9,129,630 B1 | 9/2015 | Guo et al. | |
| 9,361,919 B1 | 6/2016 | Lieu et al. | |
| 9,792,938 B1 | 10/2017 | Kobayashi et al. | |
| 2004/0036999 A1 * | 2/2004 | Chrappan Soldavini | H02P 25/034 360/78.04 |
| 2004/0257693 A1 | 12/2004 | Ehrlich | |
| 2006/0109586 A1 * | 5/2006 | White | G11B 5/5534 360/78.05 |

(Continued)

*Primary Examiner* — Tan X Dinh

(57) ABSTRACT

A data storage device is disclosed comprising a voice coil motor (VCM) having a resonance frequency, a first disk surface comprising a first set of servo sectors written at a frequency less than twice the VCM resonance frequency, and a second disk surface comprising a second set of servo sectors circumferentially offset from the first set of servo sectors and written at a frequency less than twice the VCM resonance frequency. An access of the first disk surface is performed by reading at least one of the first set of servo sectors to generate a first position error signal (PES), reading at least one of the second set of servo sectors to generate a second PES, and controlling the VCM based on the first PES and the second PES to position a first head over the first disk surface while accessing the first disk surface.

19 Claims, 8 Drawing Sheets

(56) References Cited

U.S. PATENT DOCUMENTS

| | | | |
|---|---|---|---|
| 2006/0171062 A1* | 8/2006 | Hirano | G11B 5/5552 |
| | | | 360/78.05 |
| 2008/0225428 A1 | 9/2008 | Ishiguro | |
| 2010/0142086 A1* | 6/2010 | Shen | G11B 5/5565 |
| | | | 360/78.09 |
| 2016/0071536 A1* | 3/2016 | Ishihara | G11B 5/5526 |
| | | | 360/39 |

\* cited by examiner

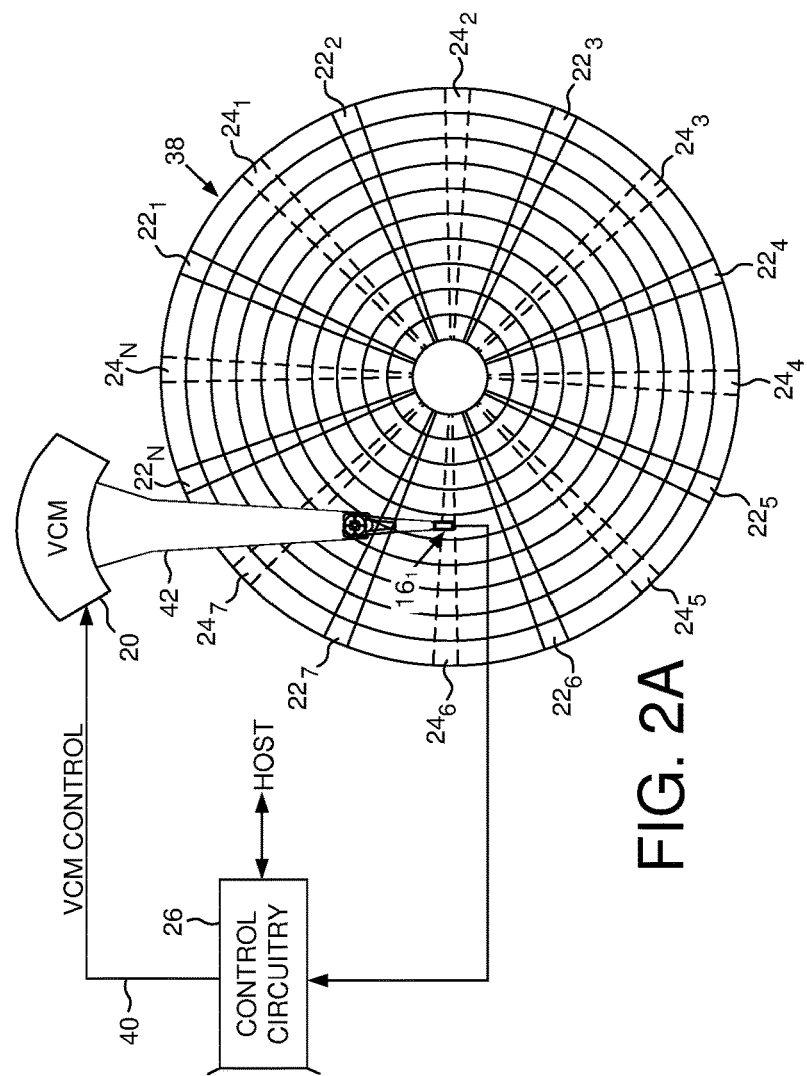
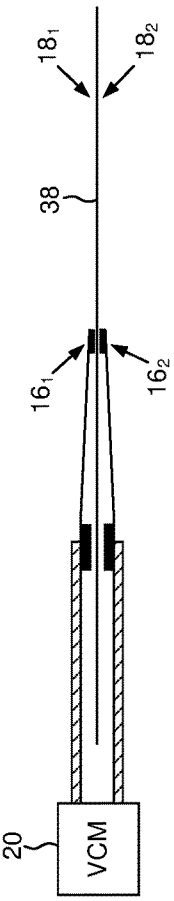
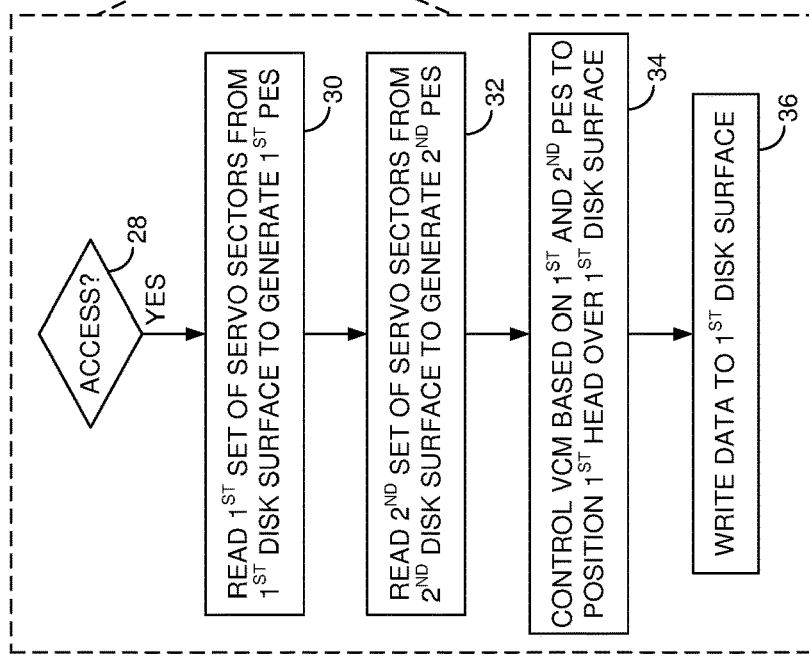
FIG. 2A
FIG. 2B
FIG. 2C

DATA STORAGE DEVICE EMPLOYING STAGGERED SERVO WEDGES TO INCREASE CAPACITY

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive according to an embodiment comprising a first disk surface having a first set of servo sectors written at a frequency less than twice the VCM resonance frequency, and a second disk surface having a second set of servo sectors circumferentially offset from the first set of servo sectors and written at a frequency less than twice the VCM resonance frequency.

FIG. 2C is a flow diagram according to an embodiment wherein at least a first head is actuated over the first disk surface based on the first and second set of servo sectors.

DETAILED DESCRIPTION

Figure 1:
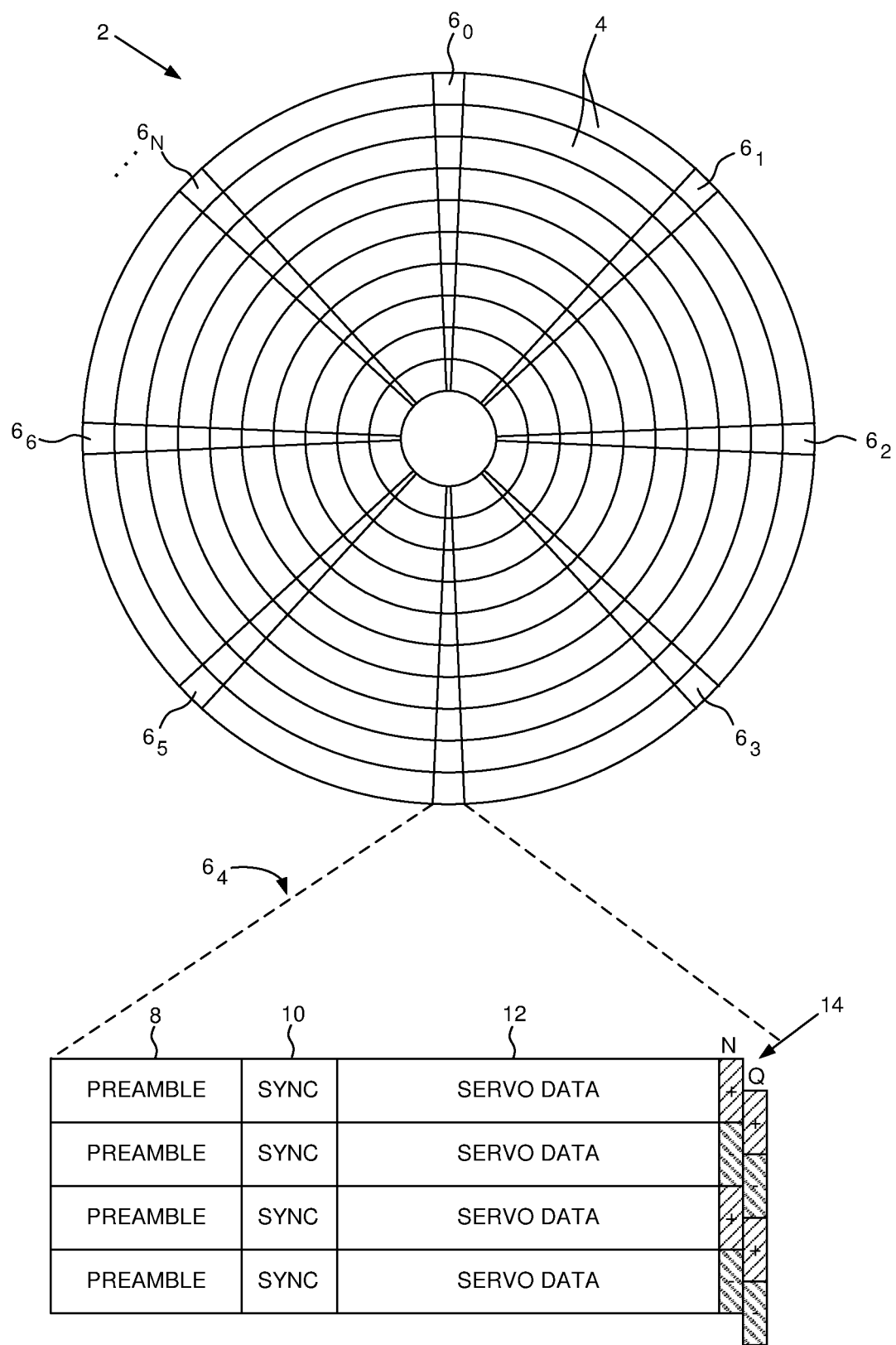
FIG. 1 shows a prior art disk format comprising a plurality of servo tracks defined by servo sectors.

FIGS. 2A and 2B show a data storage device in the form of a disk drive according to an embodiment comprising a first head $16_1$ actuated over a first disk surface $18_1$, and a second head $16_2$ actuated over a second disk surface $18_2$ by a voice coil motor (VCM) 20 having a resonance frequency. The first disk surface $18_1$ comprises a first set of servo sectors $22_1$-$22_N$ written at a frequency less than two times the VCM resonance frequency. The second disk surface $18_2$ comprises a second set of servo sectors $24_1$-$24_N$ circumferentially offset from the first set of servo sectors $22_1$-$22_N$ and written at a frequency less than two times the VCM resonance frequency. The disk drive further comprises control circuitry 26 configured to execute the flow diagram of FIG. 2C wherein during an access operation to the first disk surface (block 28), at least one of the first set of servo sectors is read to generate a first position error signal (PES) (block 30), and at least one of the second set of servo sectors is read to generate a second PES (block 32). The VCM is controlled based on the first PES and the second PES to position the first head over the first disk surface (block 34) while accessing the first disk surface (block 36).

In the embodiment of FIGS. 2A and 2B, the first disk surface $18_1$ is the top surface of a disk 38 and the second disk surface $18_2$ is the bottom surface of the disk 38. The first set of servo sectors $22_1$-$22_N$ are written to the top disk surface $18_1$ and the second set of servo sectors $24_1$-$24_N$ are written to the bottom disk surface $18_2$ circumferentially offset from the first set of servo sectors $22_1$-$22_N$. The control circuitry 26 processes the read signals emanating from the heads to demodulate the servo sectors and generate a position error signal (PES) representing an error between the actual position of the head and a target position relative to a target track. A servo control system in the control circuitry 26 filters the PES using a suitable compensation filter to generate a control signal 40 applied to the VCM 20 which rotates an actuator arm 42 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1). In one embodiment, the first set of servo sectors $22_1$-$22_N$ and the second set of servo sectors $24_1$-$24_N$ are written to the disk surfaces during a servo writing procedure. The servo writing procedure may be executed by an external servo writer wherein the servo written disks are installed into production disk drives, and in another embodiment the servo writing procedure may be executed by the control circuitry 26 of each disk drive (i.e., the servo sectors may be self-servo written).

Conventionally the frequency of the servo sectors written to any single disk surface (and the corresponding number of servo sectors per track) is configured to achieve adequate servo performance for a target data density (tracks per inch (TPI) and linear bits per inch (BPI)). That is, as the target data density increases it results in a corresponding increase in the servo sector frequency in order to maintain adequate servo performance. The tradeoff of a higher servo sector frequency is a reduction in overall capacity due to a reduction in the recording area available for storing user data. In one embodiment, the number of servo sectors written to any one disk surface may be reduced by processing the servo sectors from multiple disk surfaces during an access operation.

Figure 3A:
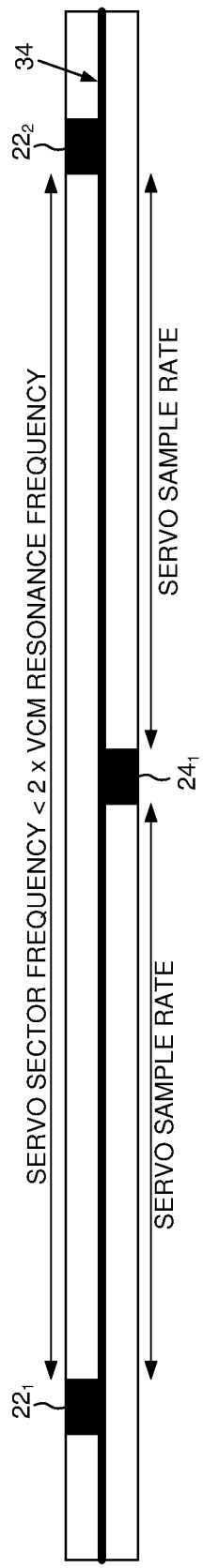
FIG. 3A shows an embodiment wherein the second set of servo sectors are circumferentially offset from the first set of servo sectors by an approximately 180 degree phase offset.

FIG. 3A shows an example embodiment wherein the second set of servo sectors $24_1$-$24_N$ are circumferentially offset from the first set of servo sectors $22_1$-$22_N$ by a phase offset substantially equal to 180 degrees. The first and second set of servo sectors are written to their respective disk surfaces at a frequency that is less than twice the VCM resonance frequency, wherein processing the first and second set of servo sectors in an interleaved manner effectively doubles the servo sample rate such that the combined servo sample frequency is greater than twice the VCM resonance frequency. This embodiment enables a reduction in the number of servo sectors per disk surface and a corresponding increase in the overall capacity as compared to a disk drive that processes the servo sectors written on a single disk surface.

Figure 3B:
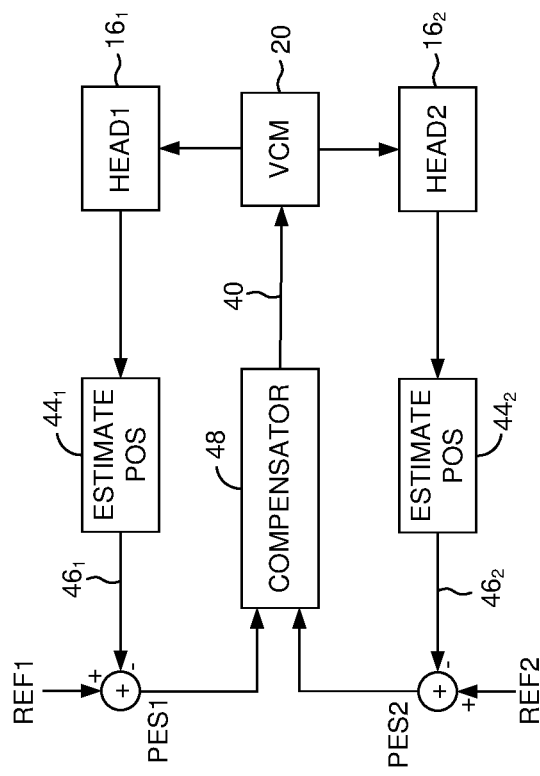
FIG. 3B shows control circuitry according to an embodiment for controlling the VCM based on the first and second set of servo sectors while writing data to at least the first disk surface.

FIG. 3B shows control circuitry according to an embodiment for controlling the VCM 20 based on the first and second set of servo sectors while writing data to at least the first disk surface. In this embodiment, the read signal emanating from each head while reading a respective servo sector is demodulated (blocks $44_1$ and $44_2$) into estimated positions $46_1$ and $46_2$ which are subtracted from reference positions to generate respective position error signals PES1 and PES2. The first PES1 and second PES2 are processed by a servo compensator 48 to generate a control signal 40 applied to the VCM 20 in order to position at least the first head over the first disk surface during the access operation. In one embodiment, the VCM 20 controls the position of both the first and second heads in order to concurrently access both disk surfaces, such as concurrent write or read operations. In this embodiment, the servo compensator 48 is able to compensate for the VCM resonance frequency since the combined servo sample frequency of the first and second set of servo sectors is greater than twice the VCM resonance frequency.

Figure 4A:
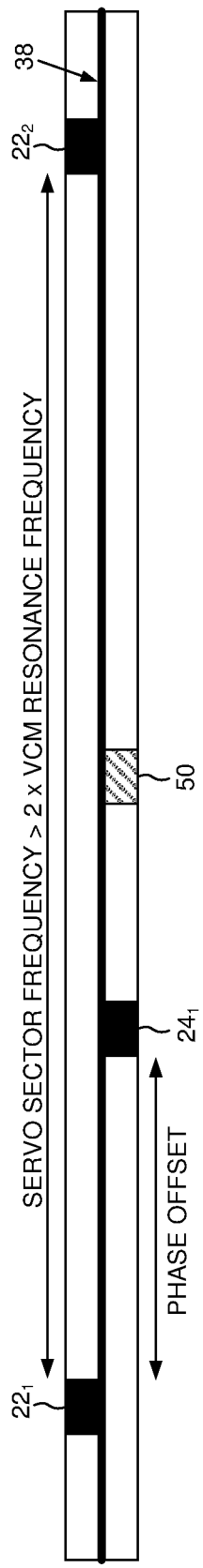
FIG. 4A shows an embodiment wherein the first set of servo sectors are circumferentially offset from the second set of servo sectors by a phase offset unequal to 180 degrees.

FIG. 4A shows an embodiment wherein the second set of servo sectors $24_1$-$24_N$ are circumferentially offset from the first set of servo sectors $22_1$-$22_N$ by a phase offset unequal to 180 degrees (where a phase offset of 180 degrees occurs at location 50). In one embodiment, the second set of servo sectors $24_1$-$24_N$ are written to the second disk surface so as to achieve a predetermined phase offset unequal to 180 degrees. For example, in one embodiment the second set of servo sectors $24_1$-$24_N$ may be written to the second disk surface with a phase offset that improves the detection of an off-track condition so that a write operation may be aborted before overwriting data in adjacent data tracks. Referring to the example of FIG. 4A, writing the second set servo sector $24_1$ at a phase offset less than 180 degrees means that the second set servo sector $24_1$ is processed at a reduced interval after processing the first set servo sector $22_1$, wherein the reduced interval may result in the earlier detection of an off-track condition.

In one embodiment, a vibration affecting the disk drive may more significantly impact the servoing of the heads over the disk surfaces that are closest to the enclosure of the disk drive. That is, in a disk drive having multiple disks clamped to the spindle motor, the top disk surface of the top disk and the bottom disk surface of the bottom disk are typically more significantly impacted by a vibration affecting the enclosure. Accordingly in one embodiment, the first set of servo sectors $22_1$-$22_N$ may be written to the top surface of a top disk and the second, staggered set of servo sectors $24_1$-$24_N$ may be written to the bottom surface of a bottom disk. In one embodiment, the second set of servo sectors $24_1$-$24_N$ may be written at a phase offset less than 180 degrees as described above to improve the off-track detection of a vibration affecting the top surface of the top disk and the bottom surface of the bottom disk.

Figure 4B:
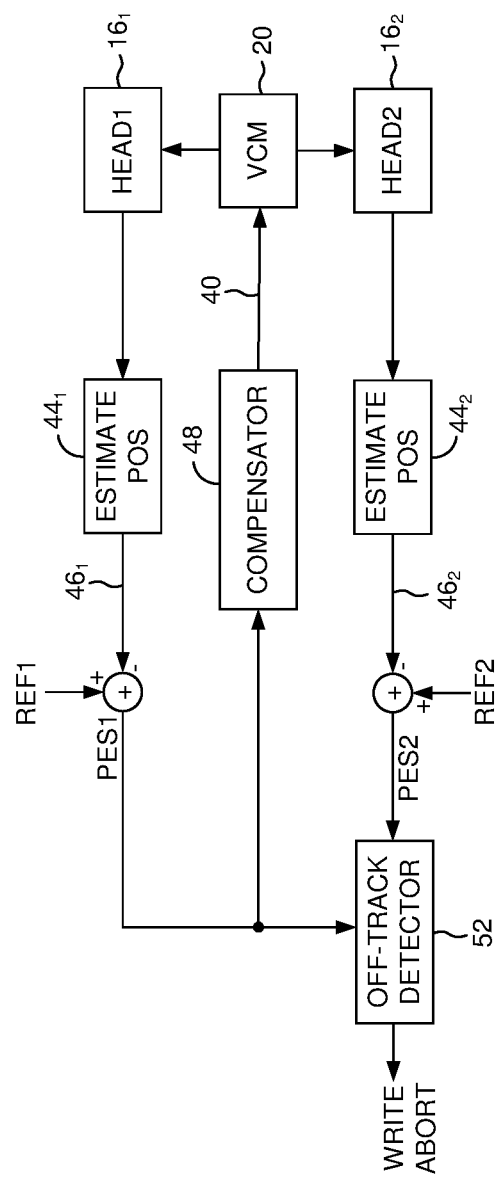
FIG. 4B shows control circuitry according to an embodiment wherein a first head is servoed over the first disk surface based on the first PES, and an off-track condition is detected based on the first PES and the second PES.

In one embodiment shown in FIG. 4B, the servo compensator 48 of the control circuitry may process only the first PES1 generated from reading the first set of servo sectors in order to control the VCM 20 to position of the first head over the first disk surface while accessing the first disk surface. In this embodiment, an off-track detector 52 may detect an off-track condition based on the first PES1 or the second PES2, for example, if either PES exceeds a predetermined threshold, wherein a write operation is aborted when the off-track condition is detected. In the embodiment of FIG. 4A, the servo sector frequency of the first set of servo sectors $22_1$-$22_N$ is twice the VCM resonance frequency so that the servo compensator 48 may compensate for disturbances that may excite the VCM resonance frequency.

Figure 5A:
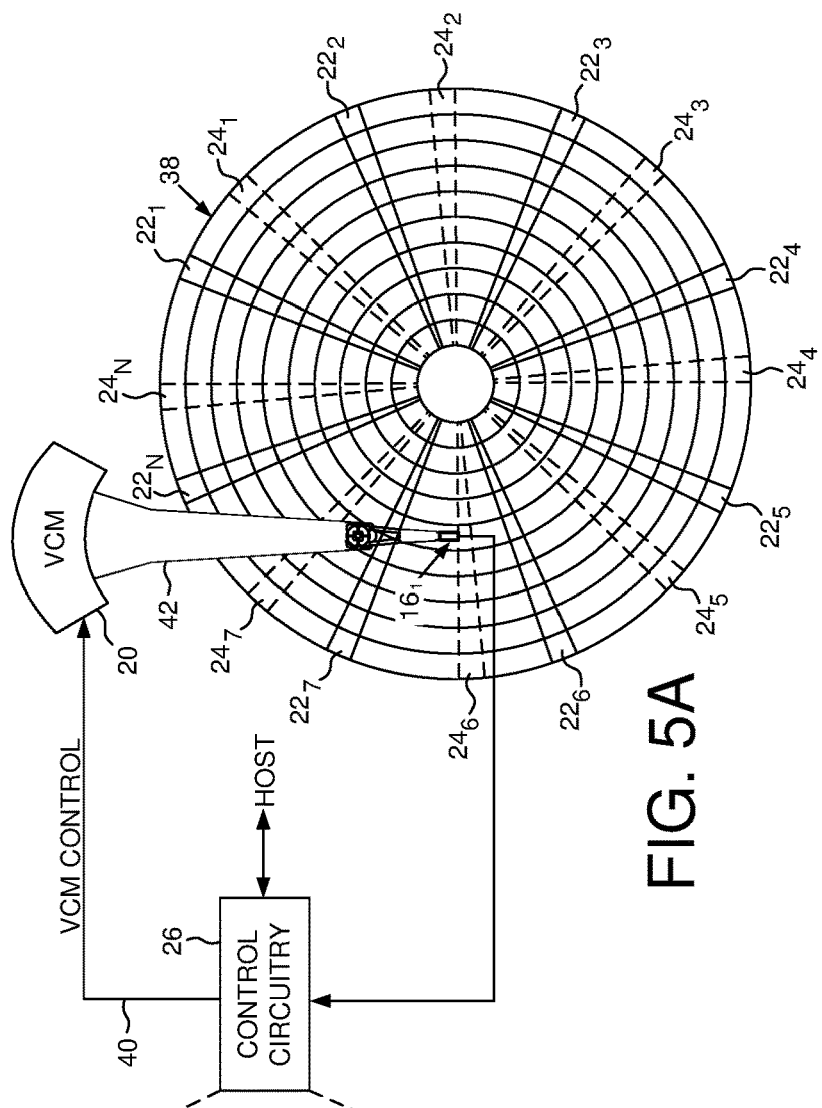
FIG. 5A shows a data storage device in the form of a disk drive according to an embodiment comprising a first disk surface having a first set of servo sectors, and a second disk surface having a second set of servo sectors circumferentially offset from the first set of servo sectors by a phase offset unequal to 180 degrees.
Figure 5B:
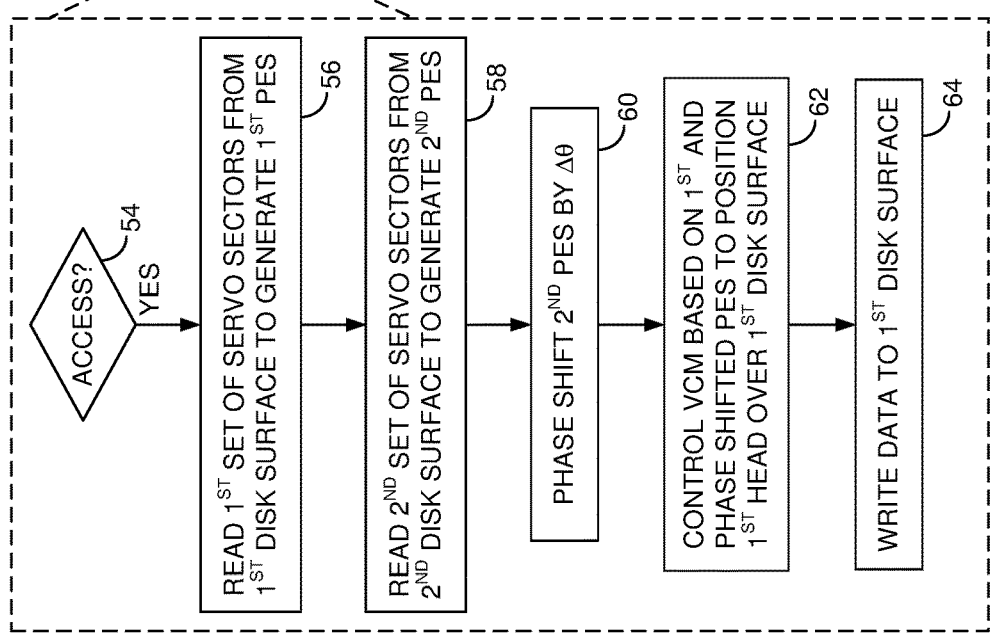
FIG. 5B is a flow diagram according to an embodiment wherein a second PES generated from reading the second set of servo sectors is phase shifted to achieve a 180 degree phase offset, wherein the VCM is controlled using a first PES generated from reading the first servo sectors and the phase shifted PES.

FIG. 5A shows a data storage device in the form of a disk drive according to an embodiment wherein the second set of servo sectors $24_1$-$24_N$ are circumferentially offset from the first set of servo sectors $22_1$-$22_N$ by a phase offset unequal to 180 degrees. FIG. 5B is a flow diagram according to an embodiment executed by the control circuitry 26 in order to write data to at least the first disk surface during an access operation (block 54).

The first set of servo sectors are read to generate a first PES (block 56), and the second set of servo sectors are read to generate a second PES (block 58). The second PES is phase shifted by a delta phase to generate a phase shifted PES substantially aligned with a 180 degree phase offset between the first set of servo sectors and the second set of servo sectors (block 60). The VCM is controlled based on the first PES and the phase shifted PES to position at least the first head over the first disk surface (block 62) while accessing the first disk surface (block 64).

Figure 6A:
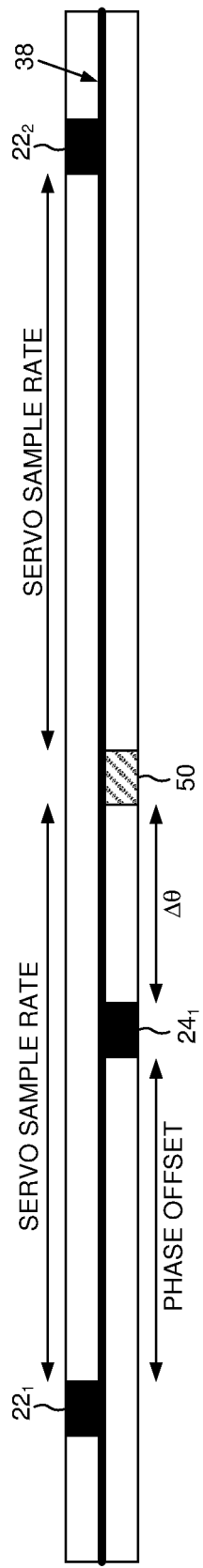
FIG. 6A shows an embodiment wherein the second set of servo sectors are phase offset from 180 degrees by a delta phase.
Figure 6B:
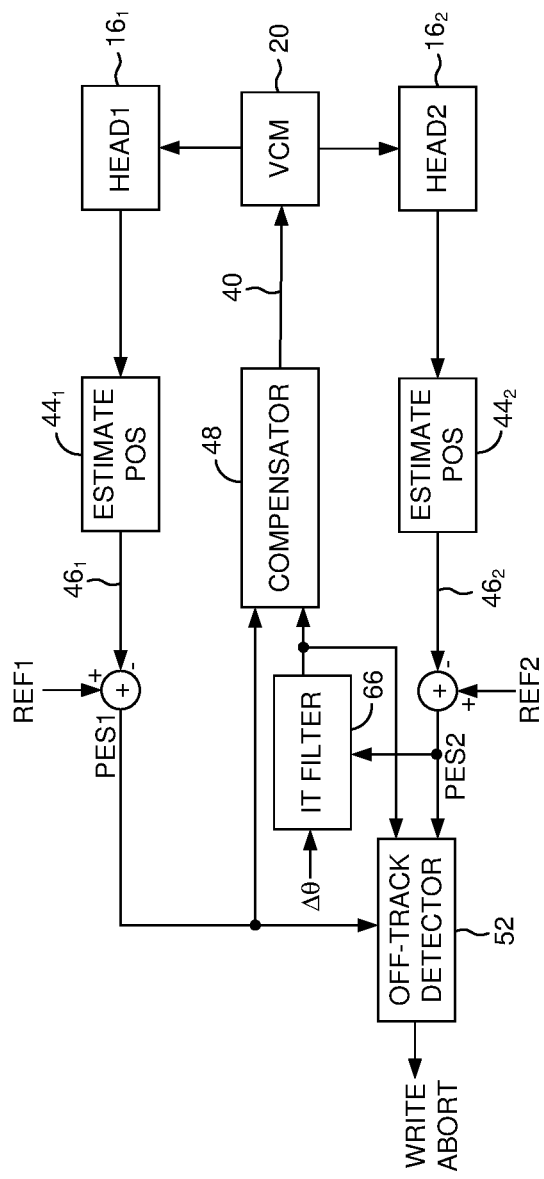
FIG. 6B shows control circuitry according to an embodiment wherein at least the first head is servoed over the first disk surface based on the first PES and a phase shifted PES.

FIG. 6A shows an embodiment wherein the first set of servo sectors $22_1$-$22_N$ and the second set of servo sectors $24_1$-$24_N$ are processed in an interleave manner in order to control the VCM 20 to position at least the first head over the first disk surface during an access operation. In this embodiment, the second set of servo sectors $24_1$-$24_N$ are circumferentially offset from the first set of servo sectors $22_1$-$22_N$ by a phase offset unequal to 180 degree. The phase offset corresponding to 180 degrees occurs at location 50, wherein there is a delta phase ($\Delta\theta$) between the second servo sector 241 and the 180 degree location 50. FIG. 6B shows control circuitry according to an embodiment wherein the second PES2 is filtered with an interpolation filter 66 in order to phase shift the second PES2 by the delta phase ($\Delta\theta$), thereby generating a phase shifted PES at a 180 degrees phase offset (i.e., aligned with location 50 in FIG. 6A in order to achieve a uniform servo sample rate when interleave processing the first and second set of servo sectors). In one embodiment, the off-track detector 52 may detect an off-track condition during a write operation based on the first PES1, the second PES2, and/or the phase shifted PES output by the interpolation filter 66 as shown in FIG. 6B. For example, an off-track condition may be detected when any one of these inputs exceeds a threshold, or based on any suitable function of the inputs (e.g., using a suitable prediction algorithm).

Figure 7:
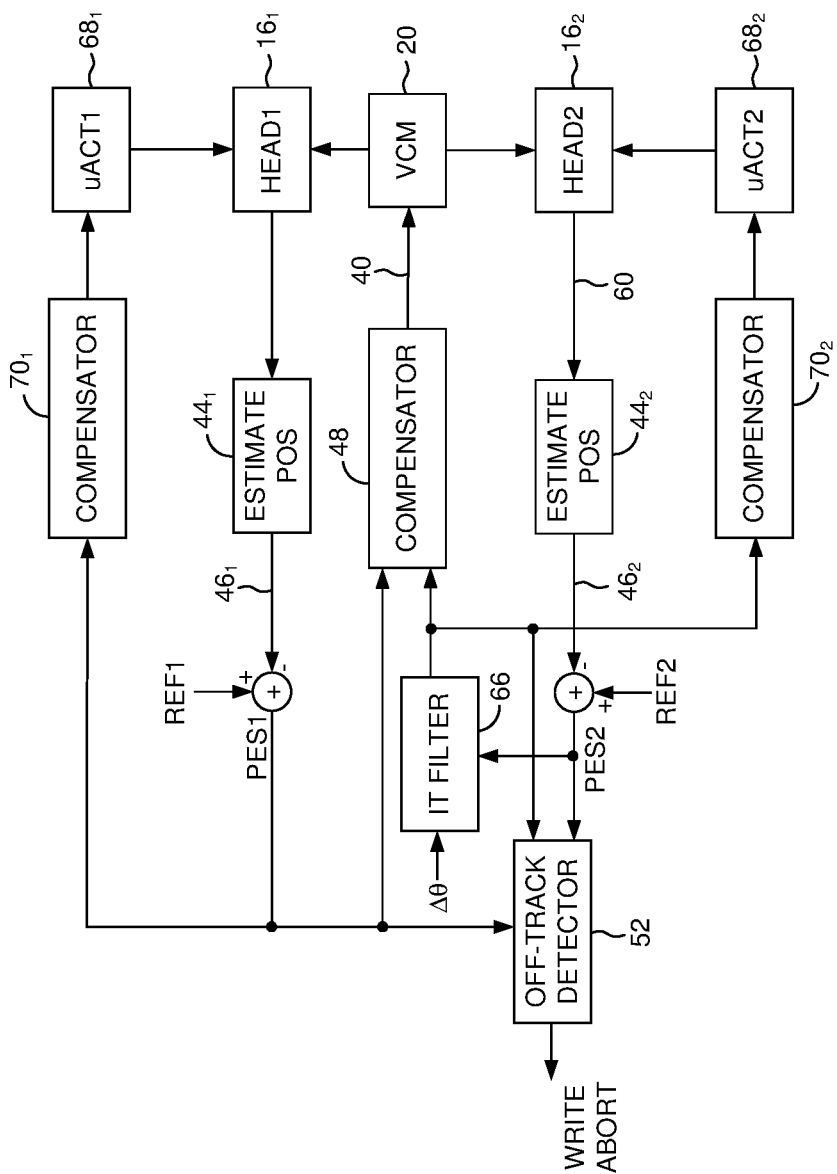
FIG. 7 shows control circuitry according to an embodiment wherein secondary actuators control respective heads based on respective PESs (including a phase shifted PES) generated from reading the first and second set of servo sectors.

FIG. 7 shows control circuitry according to an embodiment wherein each head may be actuated by the VCM 20 together with a suitable secondary actuator 68$i$, such as a secondary actuator configured to actuate a suspension relative to the actuator arm, or configured to actuate the head relative to the suspension. In this embodiment, the first PES1 is processed by a first compensator $70_1$ configured to generate a control signal applied to a first secondary actuator $68_1$, and the phase shifted PES output by the interpolation filter 66 is processed by a second compensator $70_2$ to generate a control signal applied to a second secondary actuator $68_2$. In one embodiment, at least one of the first or second heads are servoed by the control circuitry in FIG. 7 in order to access a respective disk surface, and in another embodiment both the first and second heads are servoed by the control circuitry in order to concurrently access both disk surfaces.

In one embodiment, the phase offset between the first and second set of servo sectors may be an intentional phase offset intended to improve the servo control system, such as improving the resolution of the off-track detector 52 as described above. In another embodiment, the phase offset of the second set of servo sectors $24_1$-$24_N$ may deviate from a target phase offset (e.g., 180 degrees) due to inaccuracies in writing the servo sectors. That is, the delta phase ($\Delta\theta$) from a target 180 degree phase offset such as shown in FIG. 6A may be a result of inaccuracies in the servo writing process. In one embodiment, after the servo sectors are written to the disk surfaces the control circuitry may measure the delta phase ($\Delta\theta$) during a calibration procedure, for example, by reading the first and second set of servo sectors in an interleaved manner and measuring an interval between the servo sectors, wherein a non-uniform interval will correspond to the measured delta phase ($\Delta\theta$).

Figure 8A:
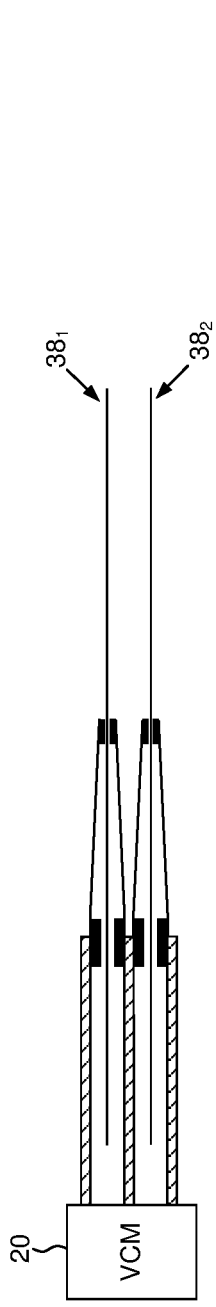
FIG. 8A shows an embodiment wherein the data storage device may comprise two or more disks with heads actuated over respective disk surfaces.
Figure 8B:
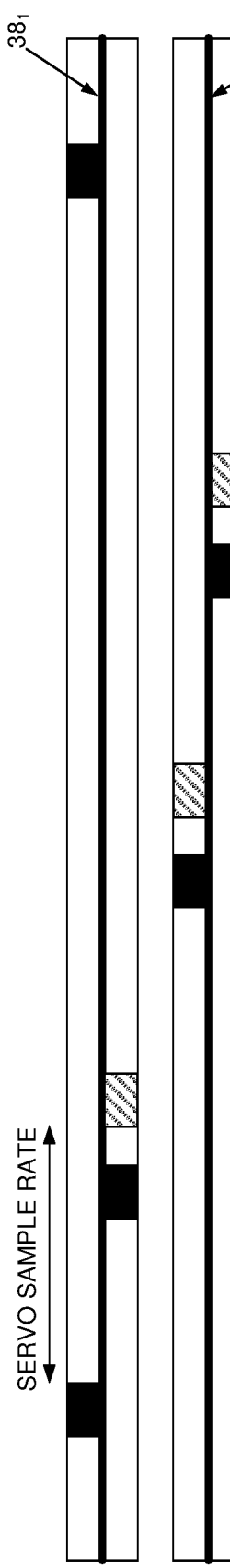
FIG. 8B shows an embodiment wherein servo sectors are written to four disk surfaces in a staggered format.
Figure 8C:
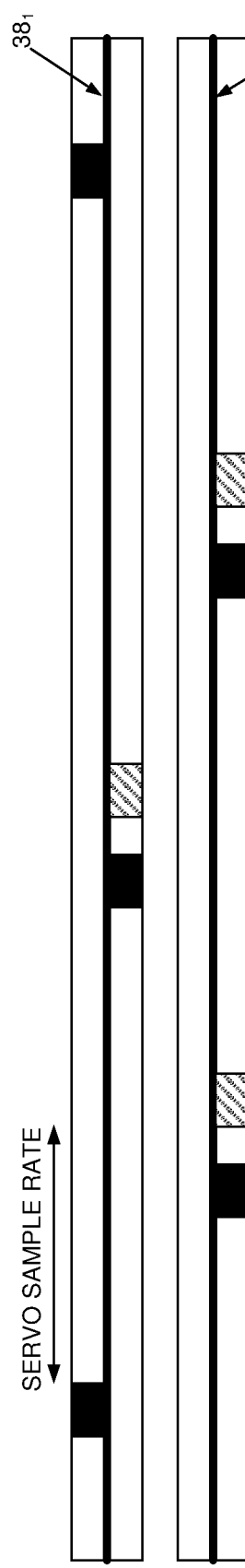
FIG. 8C shows an alternative embodiment wherein servo sectors are written to four disk surfaces in a different staggered format.

In certain embodiments, servo sectors may be written in a staggered format to the top and bottom disk surfaces of a disk such as shown in FIG. 3A. In another embodiment shown in FIG. 8A, the disk drive may comprise multiple disks wherein servo sectors may be written in a staggered format to the disk surfaces of different disks. For example, servo sectors may be written to the top disk surface of disk $38_1$, and corresponding staggered servo sectors may be written to the top or bottom disk surface of disk $38_2$. In other embodiments, the servo sectors may be written in a staggered format across more than two disk surfaces. For example in the embodiment of FIG. 8A, the servo sectors may be written to the four disk surfaces in a staggered format with varying phase offsets such as shown in FIG. 8B or FIG. 8C. In this embodiment, the number of servo sectors recorded on each disk surface may be one-fourth of a full set of servo sectors while still achieving the target servo sample rate.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a voice coil motor (VCM) having a resonance frequency;
a first disk surface comprising a first set of servo sectors written at a frequency less than twice the VCM resonance frequency;
a first head actuated over the first disk surface by the VCM;
a second disk surface comprising a second set of servo sectors circumferentially offset from the first set of servo sectors and written at a frequency less than twice the VCM resonance frequency;
a second head actuated over the second disk surface by the VCM; and
control circuitry configured to access the first disk surface by at least:
reading at least one of the first set of servo sectors to generate a first position error signal (PES);
reading at least one of the second set of servo sectors to generate a second PES; and
controlling the VCM based on the first PES and the second PES to position the first head over the first disk surface while accessing the first disk surface.

2. The data storage device as recited in claim 1, wherein a combined servo sample frequency of the first set of servo sectors and the second set of servo sectors is greater than twice the VCM resonance frequency.

3. The data storage device as recited in claim 1, wherein the second set of servo sectors are circumferentially offset from the first set of servo sectors by a phase offset unequal to 180 degrees.

4. The data storage device as recited in claim 3, wherein the control circuitry is further configured to phase shift the second PES by a delta phase to generate a phase shifted PES substantially aligned with a 180 degree phase offset between the first set of servo sectors and the second set of servo sectors.

5. The data storage device as recited in claim 4, wherein the control circuitry is further configured to measure the delta phase by reading the first set of servo sectors and the second set of servo sectors.

6. The data storage device as recited in claim 4, wherein the control circuitry is further configured to write the second set of servo sectors to the second disk surface based on the delta phase.

7. The data storage device as recited in claim 4, wherein the control circuitry comprises an interpolation filter configured to interpolate the second PES in order to phase shift the second PES by the delta phase.

8. A data storage device comprising:
a voice coil motor (VCM) having a resonance frequency;
a first disk surface comprising a first set of servo sectors;
a first head actuated over the first disk surface by the VCM;
a second disk surface comprising a second set of servo sectors circumferentially offset from the first set of servo sectors by a phase offset unequal to 180 degrees;
a second head actuated over the second disk surface by the VCM; and
control circuitry configured to access the first disk surface by at least:
reading the first set of servo sectors to generate a first position error signal (PES);
reading the second set of servo sectors to generate a second PES; and
controlling the VCM based on the first PES and the second PES to position at least the first head over the first disk surface.

9. The data storage device as recited in claim 8, wherein the control circuitry is further configured to access the first disk surface by:
phase shifting the second PES by a delta phase to generate a phase shifted PES substantially aligned with a 180 degree phase offset between the first set of servo sectors and the second set of servo sectors; and
controlling the VCM based on the first PES and the phase shifted PES to position at least the first head over the first disk surface.

10. The data storage device as recited in claim 9, wherein the control circuitry is further configured to measure the delta phase by reading the first set of servo sectors and the second set of servo sectors.

11. The data storage device as recited in claim 9, wherein the control circuitry is further configured to write the second set of servo sectors to the second disk surface based on the delta phase.

12. The data storage device as recited in claim 9, wherein the control circuitry comprises an interpolation filter configured to interpolate the second PES in order to phase shift the second PES by the delta phase.

13. The data storage device as recited in claim 8, wherein:
the first set of servo sectors are written at a frequency less than twice the VCM resonance frequency; and
the second set of servo sectors are written at a frequency less than twice the VCM resonance frequency.

14. The data storage device as recited in claim 13, wherein a combined servo sample frequency of the first set of servo sectors and the second set of servo sectors is greater than twice the VCM resonance frequency.

15. The data storage device as recited in claim 8, wherein the control circuitry is further configured to:
detect an off-track condition based on at least the first PES or the second PES; and abort a write operation when the off-track condition is detected.

16. The data storage device as recited in claim 8, wherein the control circuitry is further configured to:
   detect an off-track condition based on at least the phase shifted PES; and
   abort a write operation when the off-track condition is detected.

17. A data storage device comprising:
   a voice coil motor (VCM) having a resonance frequency;
   a first disk surface comprising a first set of servo sectors written at a frequency less than twice the VCM resonance frequency;
   a first head actuated over the first disk surface by the VCM;
   a second disk surface comprising a second set of servo sectors circumferentially offset from the first set of servo sectors and written at a frequency less than twice the VCM resonance frequency;
   a second head actuated over the second disk surface by the VCM; and
   a means for accessing the first disk surface by reading the first set of servo sectors and the second set of servo sectors.

18. The data storage device as recited in claim 17, wherein the means for accessing comprises a means for controlling the VCM based on the first set of servo sectors and the second set of servo sectors to position the first head over the first disk surface.

19. The data storage device as recited in claim 17, wherein the second set of servo sectors are circumferentially offset from the first set of servo sectors by a phase offset unequal to 180 degrees.

* * * * *